May 8, 1962 L. J. SHEEHAN 3,033,151
SHIP AND PIER FENDER

Filed June 30, 1960 3 Sheets-Sheet 1

INVENTOR.
LEO JAMES SHEEHAN
BY
Max J. Farmer
ATTORNEY

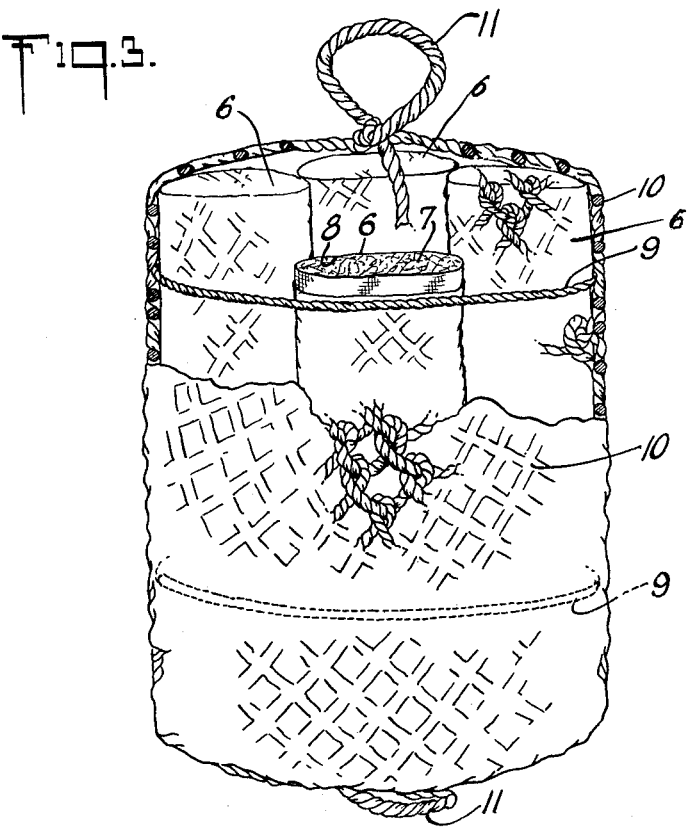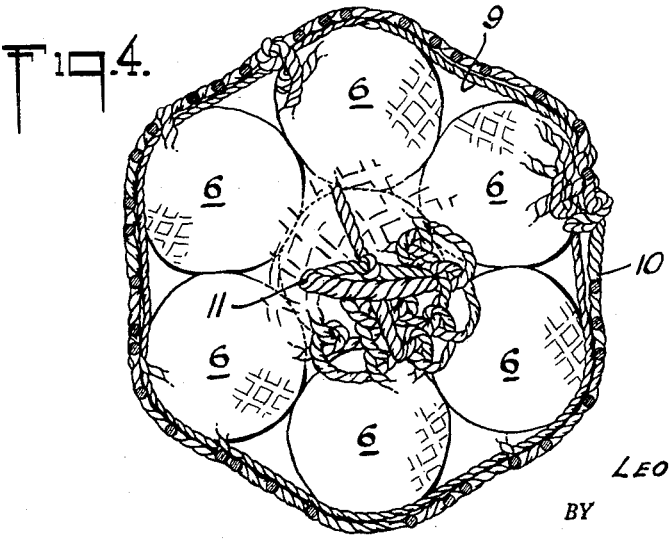

May 8, 1962 L. J. SHEEHAN 3,033,151
SHIP AND PIER FENDER
Filed June 30, 1960 3 Sheets-Sheet 3

INVENTOR.
LEO JAMES SHEEHAN
BY
Max A. Garner
ATTORNEYS

United States Patent Office 3,033,151
Patented May 8, 1962

3,033,151
SHIP AND PIER FENDER
Leo James Sheehan, 173 High St., Reading, Mass.
Filed June 30, 1960, Ser. No. 40,121
8 Claims. (Cl. 114—219)
(Granted under Title 35, U.S. Code (1952), sec. 266)

The invention described herein may be manufactured and used by or for the Government of the United States of America for governmental purposes without the payment of any royalties thereon or therefor.

This invention relates to fenders for ships and piers or docks to protect the ships, piers and docks from damage due to impact forces when vessels engage or bump into one another or a pier or dock. As an example, when vessels approach a pier or dock, there is nearly always a substantial impact, and often repeated impacts, between the ship hull and the pier or dock. To reduce the danger of damage to the ship and pier or dock, it is customary to provide a fender or fenders on the ship or dock, or both. Previous fenders were commonly made of rolled coir matting and other natural hard fiber materials. These types of fenders have low compressional resiliency, high water absorption and low rot resistance and hence are not suitably effective or satisfactory for fending large vessels under repeated impacts.

An object of this invention is to provide an improved fender for use between vessels and between vessels and docks or piers, which will have high compressional resiliency, low water absorption, and high rot resistance, which will successfully withstand without material damage repeated heavy impacts and provide adequate protection against impact damage to ships and docks or piers for long periods of use, without collapse, rot or wearing away, which may be easily and inexpensively made in different desired sizes, and which are practical and simple in construction, and effective and durable in use.

Other objects and advantages will be apparent from the following description of examples of the invention, and the novel features will be particularly pointed out hereinafter in connection with the appended claims.

In the accompanying drawing:

FIG. 3 is a side elevation, partly in section, of a 7 bag fender also constructed in accordance with this invention;

FIG. 4 is a top plan, partly in section, of the same; and

Figure 1:
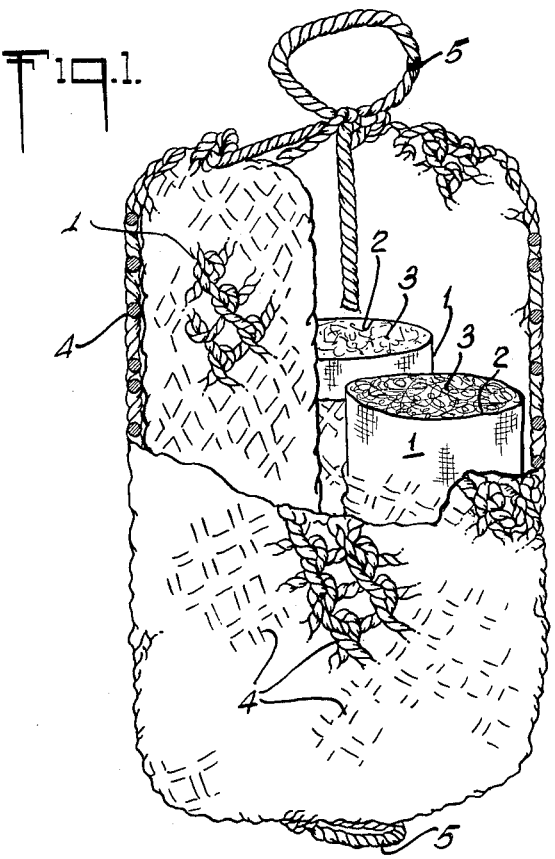
FIG. 1 is a side elevation, partly in section, of a 3 bag fender constructed in accordance with this invention.
Figure 2:
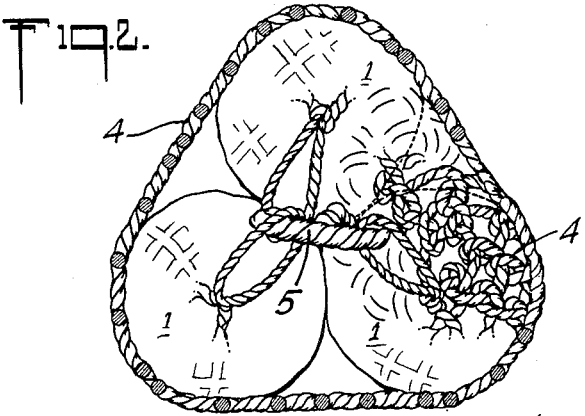
FIG. 2 is a top plan, partly in section, of the same.

In the embodiment of the invention illustrated in FIGS. 1 and 2, the fender includes three bags, 1 formed of woven nylon canvas fabric, each coated on one of its surfaces, such as its inner surface, with an elastomeric coating material 2, such as neoprene, to make it water resistant. Each such bag is stuffed with nylon fiber waste 3. Three of these bags are assembled as a group in side by side abutting relation, and then lashed or otherwise confined together in any suitable manner and then this group is surrounded by a knitted enclosure 4 of nylon rope. The rope is half-hitched over the group to form an enclosing rope network for the group of bags, or, if desired, each bag may be enclosed in a network of nylon rope, half-hitched or full-hitched, and then such bags so enclosed in such network, enclosed in the enclosing network of nylon rope, preferably with half-hitched or full-hitched rope, to provide greater resiliency of the fender due to the larger number of enclosing rope networks.

The outer enclosing network has a rope becket 5 on each end by which the fender may be handled and supported in a desired operative position on an exposed wall of a vessel's hull or on the dock or pier. Such a 3 bag fender may, for example, have a length of 42 inches using bags of 36 inches long and 10 inches diameter. The nylon rope that is used in making the enclosing network may be 2¼ inch circ. nylon rope. The nylon fabric for the bags may be 14½ oz. nylon canvas coated on one side with a continuous but thin layer of neoprene or other suitable water resistant, flexible material. Elastomeric materials are preferable for such coatings.

In the embodiment illustrated in FIGS. 3 and 4, seven fabric bags 6, similar in construction to bags 1 of FIGS. 1 and 2 are employed, and each stuffed with nylon waste 7. Each bag 6 is coated on one surface, such as its inside surface, with a water impervious, flexible material 8, preferably an elastomeric material such as neoprene. These seven bags are assembled in a group, in a side by side, abutting relation to one another in the group, such as with one bag in the center and the other six bags grouped around the center bag. These bags of the group are lashed together by a nylon rope 9 which surrounds the group and holds the bags in the desired assembled relation. The diameters and cross-sectional shapes of the bags in this group will be selected to cause them to abut one another around and with the center bag, and the center bag need not necessarily be of the same diameter as of the bags surrounding it.

A nylon rope is half-hitched or full-hitched around the group of bags 6 to form a network enclosure 10 for the group. This network enclosure also has end beckets 11 of nylon rope.

While nylon has been described as the preferred fiber material for the bags, waste and ropes, since it is relatively inexpensive and satisfactory, the use of other fibers, such as polyester fibers for example, is contemplated in place of the nylon if such other fibers are highly elastic and rot resistant, hydrophobic, and have high compressional and tensional resiliency, and will stand up well under repeated direct and glancing impacts in use. The other synthetic or man-made fibers which have these properties are suitable within this broad concept of the invention, but those of higher cost than nylon may possibly not be commonly used for economic reasons. The half-hitching or full hitching of the rope in making the network enclosure for a group of bags is advantageous as giving high resiliency to the fender.

Figure 5:
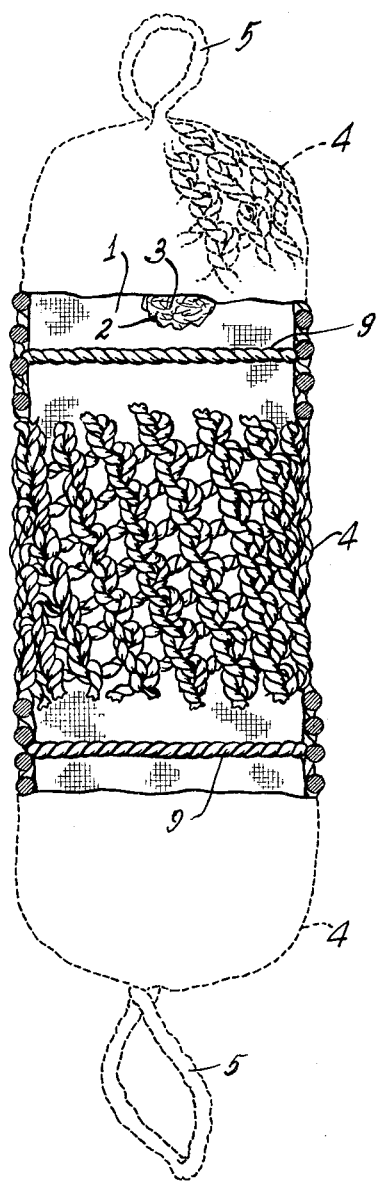
FIG. 5 is a side elevation, partly in section, of a one bag fender that may be used alone as a fender, or a group of which may be enclosed in a rope network to form a larger fender.

Fenders made in this manner and of the specified materials are practical and durable, and will stand up and maintain their strength and resiliency under long periods of use and repeated impact, without collapse, rot or wearing away. The fenders may be made with various different numbers of bags and arranged in any side by side abutting relation in the group. Such a fender can be made of a single bag stuffed with waste and enclosed in a rope network as shown in FIG. 5, and used alone as a fender or a group of them may be enclosed in another rope network for use as a larger fender. Multiple bags of desired sizes, with half-hitching over each bag or over multiple bags, or only over combined groups of bags may be used. The fenders may be easily made in various desired sizes with a wide range in weights depending on the method and materials of construction.

It will be understood that various changes in the details, materials, and arrangements of parts, which have been herein described and illustrated in order to explain the nature of the invention, may be made by those skilled in the art within the principle and scope of the invention as expressed in the appended claims.

I claim:

1. A ship and pier fender comprising a plurality of fabric bags, each bag being coated on one surface with a continuous thin layer of water resistant, flexible elastomeric material and stuffed with loose nylon fiber waste, said bags being in a group in side by side relation, and said group being confined within an enclosure of knitted rope, said bags, waste and enclosure being formed from man-made, synthetic fibers that are rot resistant, hydrophobic and highly resilient to compression and tension.

2. A ship and pier fender comprising a plurality of fabric bags, each bag being coated on one surface with a water resistant, flexible elastomeric material and stuffed with fiber waste, said bags being in a group in side by side relation, and said group being confined within an enclosure of knitted rope having beckets, said bags, waste and enclosure being formed from manmade, synthetic fibers that are rot resistant, hydrophobic and highly resilient to compression and tension.

3. A ship and pier fender comprising a plurality of fabric bags, each bag being coated on one of its surfaces with a water resistant, flexible elastomeric material and stuffed with fiber waste, said bags being arranged in a group in side by side abutting relation, and an enclosure of knitted rope containing said group of bags, in which the rope is half hitched, said bags, waste and enclosure rope being formed from synthetic fibers that are rot resistant, hydrophobic and highly resistant to compression and tension.

4. The fender according to claim 3, wherein said synthetic fibers are nylon fibers.

5. A ship and pier fender comprising a plurality of fibrous fabric bags arranged in abutting side by side relation in a group and each stuffed with fibrous waste, and an enclosure of knitted rope, for said group of bags, the fibers of said bags, said waste and said enclosure being synthetic fibers that are highly rot resistant, hydrophobic and highly resilient to compression and tension.

6. The fender according to claim 5, wherein said fibers are nylon.

7. A ship or dock fender comprising a fibrous fabric bag coated on one surface with an elastomeric material, stuffed with fibrous waste, and enclosed in a fibrous rope network, the fibers of the bag, waste and network being synthetic fibers that are highly rot resistant, substantially hydrophobic and highly resilient to compression and tension.

8. The fender according to claim 7, in which the fibers are of nylon.

References Cited in the file of this patent

UNITED STATES PATENTS

| | | |
|---|---|---|
| 2,424,635 | Schwall | July 29, 1947 |
| 2,433,569 | Marchal | Dec. 30, 1947 |
| 2,956,530 | Hobbs | Oct. 18, 1960 |

FOREIGN PATENTS

| | | |
|---|---|---|
| 373,369 | Italy | July 25, 1939 |

OTHER REFERENCES

"About Du Pont Nylon," copyright 1946 by Du Pont, Inc., page 5.